US011658545B2

United States Patent
Alanis et al.

(10) Patent No.: US 11,658,545 B2
(45) Date of Patent: May 23, 2023

(54) BRUSHLESS DIRECT CURRENT MOTOR END CAP

(71) Applicant: Snap-on Incorporated, Kenosha, WI (US)

(72) Inventors: Isidro Alanis, Kenosha, WI (US); Jason Genz, Greendale, WI (US); Michael Rajzer, Greendale, WI (US)

(73) Assignee: Snap-on Incorporated, Kenosha, WI (US)

( * ) Notice: Subject to any disclaimer, the term of this patent is extended or adjusted under 35 U.S.C. 154(b) by 229 days.

(21) Appl. No.: 16/906,320

(22) Filed: Jun. 19, 2020

(65) Prior Publication Data

US 2021/0399611 A1 Dec. 23, 2021

(51) Int. Cl.
| | |
|---|---|
| *H02K 9/22* | (2006.01) |
| *H02K 9/02* | (2006.01) |
| *B25F 5/00* | (2006.01) |
| *H02K 11/33* | (2016.01) |
| *H02K 7/14* | (2006.01) |

(52) U.S. Cl.
CPC ............ *H02K 9/227* (2021.01); *B25F 5/008* (2013.01); *H02K 7/145* (2013.01); *H02K 9/02* (2013.01); *H02K 9/22* (2013.01); *H02K 11/33* (2016.01)

(58) Field of Classification Search
CPC . H02K 7/14; H02K 5/18; H02K 11/33; H02K 9/22; H02K 9/227; H02K 7/145; H02K 9/06; H02K 2211/03; H02K 9/00; H02K 9/02; H02K 9/04; H02K 9/08; H02K 9/10; H02K 9/12; H02K 9/14; H02K 9/16; H02K 9/18; B25F 5/008

USPC ............. 310/47, 50, 64, 68 R, 68 D
See application file for complete search history.

(56) References Cited

U.S. PATENT DOCUMENTS

| | | | |
|---|---|---|---|
| 4,988,905 | A | 1/1991 | Tolmie, Jr. |
| 5,932,942 | A | 8/1999 | Patyk et al. |
| 6,081,056 | A | 6/2000 | Takagi et al. |
| D571,290 | S | 6/2008 | Gebhart et al. |
| 7,733,054 | B2 | 6/2010 | Philips et al. |
| 7,812,487 | B2 | 10/2010 | Bi et al. |
| 8,384,256 | B2 | 2/2013 | De Filippis |
| 8,987,960 | B2 | 3/2015 | Li et al. |
| 9,450,476 | B2 | 9/2016 | Ito et al. |
| 9,577,489 | B2 | 2/2017 | Collins et al. |
| 2003/0094867 | A1 | 5/2003 | Wolters |

(Continued)

FOREIGN PATENT DOCUMENTS

| | | |
|---|---|---|
| CN | 1906826 A | 1/2007 |
| CN | 104170220 A | 11/2014 |

(Continued)

OTHER PUBLICATIONS

Baba etal, Rotating Electric Machine for Vehicle, Nov. 25, 2010, Nippon Soken, Denso Corp, JP 2010268598 (English Machine Translation) (Year: 2010).*

(Continued)

*Primary Examiner* — Alexander A Singh
(74) *Attorney, Agent, or Firm* — Seyfarth Shaw LLP

(57) ABSTRACT

An end cap for a brushless motor that dissipates heat from a controller and switching elements of the motor through fins in the end cap. The end cap can be directly or thermally coupled to the controller and switching elements to dissipate heat out through the fins.

14 Claims, 5 Drawing Sheets

(56) References Cited

U.S. PATENT DOCUMENTS

| | | | |
|---|---|---|---|
| 2007/0103101 A1 | 5/2007 | Kikuchi et al. | |
| 2009/0179510 A1 | 7/2009 | Yoshida et al. | |
| 2014/0361645 A1 | 12/2014 | Beyerl | |
| 2015/0042187 A1 | 2/2015 | Bradfield | |
| 2015/0076942 A1 | 3/2015 | Madsen et al. | |
| 2016/0359392 A1 | 12/2016 | Mergener et al. | |
| 2017/0179803 A1 | 6/2017 | Li et al. | |
| 2019/0131852 A1 | 5/2019 | Li et al. | |
| 2019/0165633 A1* | 5/2019 | Gu | H02K 3/50 |
| 2019/0190351 A1 | 6/2019 | Gregorich et al. | |
| 2020/0227975 A1* | 7/2020 | Purohit | H02K 11/33 |

FOREIGN PATENT DOCUMENTS

| | | | |
|---|---|---|---|
| EP | 1715565 B1 * | 11/2010 | B25F 5/008 |
| JP | 2010268598 A * | 11/2010 | H02K 11/048 |
| TW | 202002470 A | 1/2020 | |

OTHER PUBLICATIONS

United Kingdom Combined Search and Examination Report for corresponding UK Application No. GB2107538.7, dated Nov. 9, 2021, 7 pages.

Taiwan Office Action for corresponding TW Application No. 110122301, dated Jan. 19, 2022, 7 pages.

Examination Report No. 1 for corresponding Application No. 2021203412 dated Feb. 11, 2022, 3 pages.

Canadian Office Action for corresponding Application No. 3,122,665 dated Oct. 3, 2022, 4 pages.

Examination Report for corresponding Application No. 2021203412 dated Oct. 7, 2022, 3 pages.

* cited by examiner

BRUSHLESS DIRECT CURRENT MOTOR END CAP

TECHNICAL FIELD OF THE INVENTION

The present application relates generally to end caps. More particularly, the present application relates to brushless direct current motor end caps with heat dissipation structures.

BACKGROUND OF THE INVENTION

Brushless motors are a common electromechanical system used in everyday applications. Some brushless motors operate by having a controller send a current signal through coils located on a stationary part called a stator. The coils cause a magnetic force to be applied when current runs through the coils. The brushless motor also includes a rotating part called a rotor with magnets that interact with the magnetic forces caused by the windings of the stator. A controller sends current through the coils on the stator, causing the magnetic field and the interaction between the stator magnetic field and the magnets on the rotor. By sending a current signal through several coil windings in a particular order, the stator creates a rotating magnetic field which interacts with the rotor causing it to rotate and generate torque.

Brushless motors are especially prevalent in tools, such as drills and power tools. The motors are activated by a trigger on a handle of the tool and apply torque to a working end of the tool. Many of these motors are framed motors, which help prevent the motor from being damaged when the tool is dropped on the ground. Other motors are frameless, which allow the rotor and stator to shift or twist with respect to one another when dropped on the ground. Framed motors are therefore helpful for damage prevention, but require end caps to maintain structural stability.

Brushless motors include controllers that include switching elements, such as metal oxide semiconductor field effect transistors (MOSFETs) that switch on and off the current signal sent through the coils of the motor. However, the effectiveness of the controller, its MOSFETs, and the brushless motor are limited by the heat they generate. Therefore, these heat generating components require significant cooling to operate effectively, which in power tools, is typically accomplished by airflow from the motor's fan. Some power tools place the controller and MOSFETs in the handle of the tool due to space limitations, cost, simplicity, etc. However, this provides a less compact design and makes cooling the controller more difficult because the airflow created by the fan is often obstructed.

SUMMARY OF THE INVENTION

The present invention broadly comprises an end cap for a brushless motor that acts as a heat sink and dissipates heat from a controller and MOSFETs of the motor. The end cap can include fins to dissipate heat and can be directly or thermally coupled to the controller or MOSFETs to dissipate heat out through the end cap. In this manner, the end cap provides a heat dissipation component with a compact design.

In particular, the present invention comprises a tool including a motor including a controller and switching elements. The controller controls the switching elements to operate the motor in response to a user input. An end cap is coupled to the motor, and includes an end cap base and a fin coupled to the end cap base. The switching elements are thermally coupled to the end cap.

Further disclosed is a motor comprising a controller that controls a rotation of the motor, and switching elements electrically coupled to the controller. The controller is adapted to control the switching elements to switch on and off in response to a user input. An end cap is coupled to the motor, and includes an end cap base and a fin coupled to the end cap base. The switching elements are thermally coupled to the end cap.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
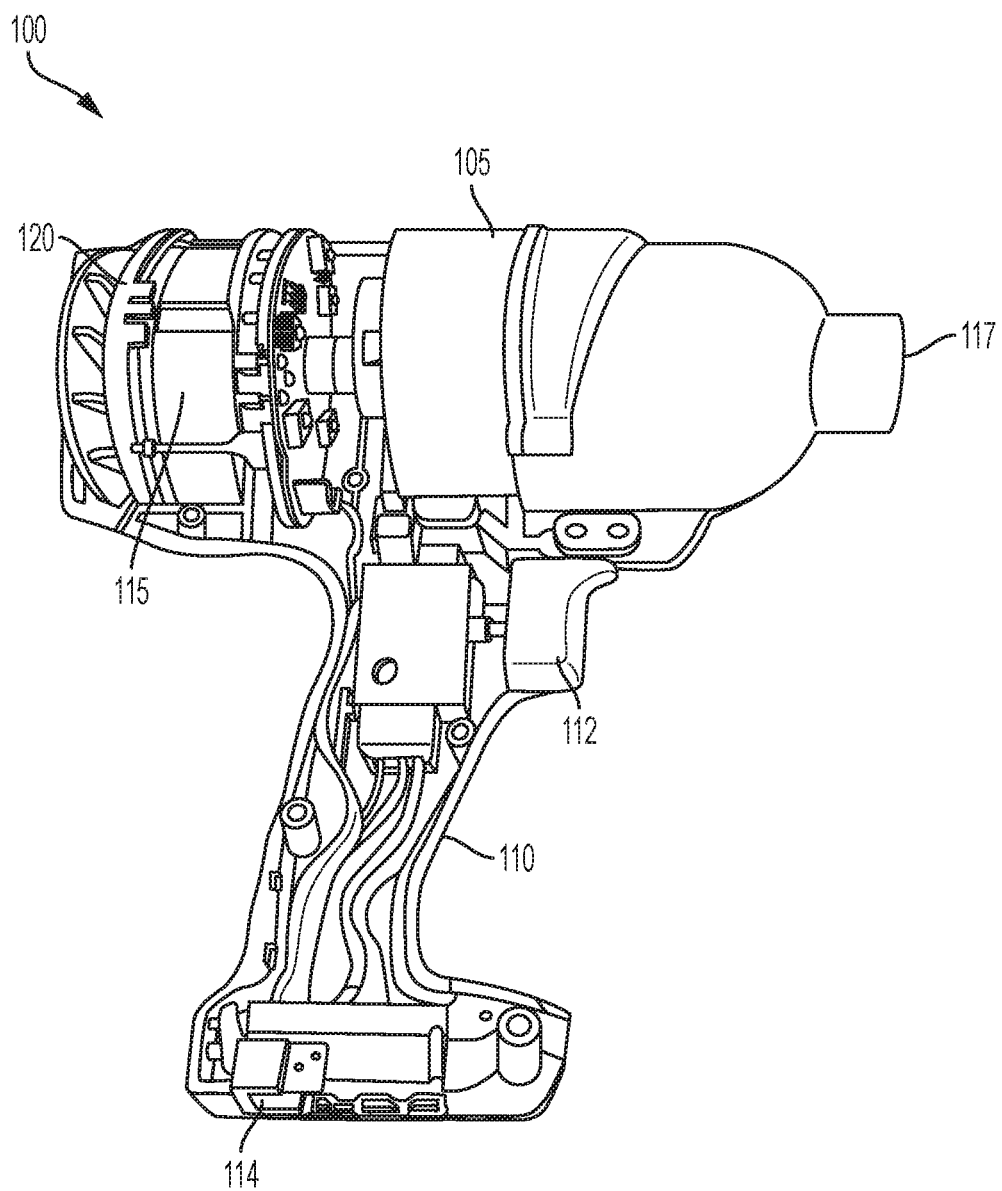
FIG. 1 is a side view of a tool according to at least one embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an end cap for a brushless motor that dissipates heat from the controller and MOSFETs associated with the motor. The end cap can be directly or thermally coupled to the controller and MOSFETs to dissipate heat out through fins in the end cap.

FIG. 1 illustrates a tool 100 according to at least some embodiments of the present invention. As shown, the tool 100 includes a body 105 leading to a handle 110, where the handle 110 has a trigger 112 for selectively allowing the flow of power from a power source 114 such as a battery or a direct wall socket connection. The trigger 112 therefore causes a motor 115 to rotate and provide torque to a working end 117 such as a drill bit or driver bit. An end cap 120 can be located on the rear end of the motor 115 for structural and heat dissipation purposes, discussed below in more detail.

The body 105 can be any size or shape and generally includes at least some of the internal components necessary for the tool 100 to function. For example, the body 105 can house gear trains or electrical components that cause torque to be applied to the working end 117.

The handle 110 can be ergonomically sized and shaped to be held by a hand of a user. The trigger 112 can be positioned at an upper portion of the handle 110 where the user's finger will likely be located during use. The handle 110 can be free of a controller or switching elements (such as MOSFETs) that would control the motor that drives the tool 100.

The motor 115 can be a direct current brushless motor, but the present invention is not so limited. The motor 115 can accordingly be any electromagnetic or electromechanical motor without deviating from the spirit and scope of the present invention.

As shown in FIGS. 2-5, the end cap 120 can serve as a structural component to help the motor 115 stay in position during, for example, a drop of the tool. The end cap 120 can also serve as a heat sink by dissipating heat from the end of the end cap 120 (rear, front, or otherwise) to the outside of the tool 100. For example, the end cap 120 can be directly or thermally coupled to the controller and switching elements (such as MOSFETs) that drive and control the motor 115 so as to dissipate heat quickly from the components of the motor 115 (such as controller 130 and switching elements 135, described in further detail below) most affected by heat. The end cap 120 can be located on the rear, front, top, bottom, or side of the tool; or any other location of the tool 100.

Figure 2:
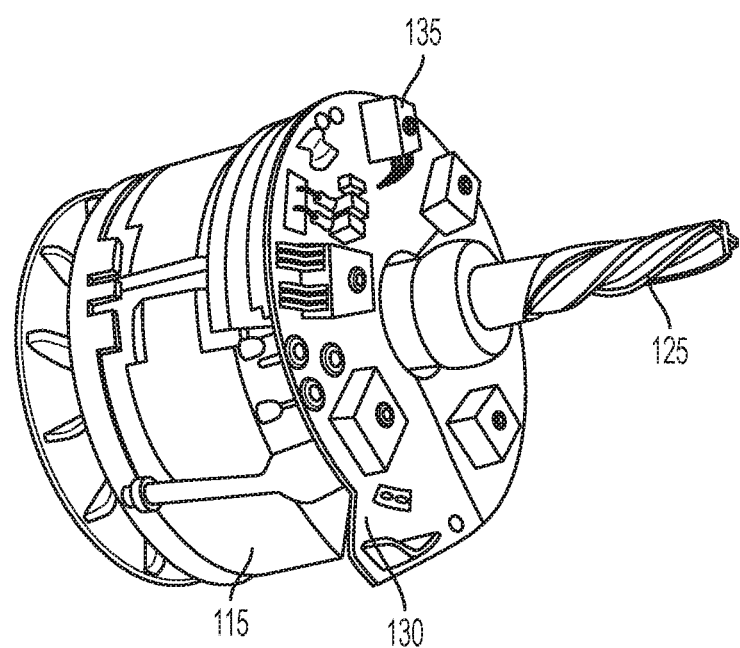
FIG. 2 is a front perspective view of internal components of a tool according to at least one embodiment of the present invention.

As shown in FIG. 2, the motor 115 can include an a shaft or axle 125 that rotates and delivers torque to a gear train or other component, which eventually transfers the torque to the working end 117. The axle 125 is coupled to the motor 115 and acts as the output of the motor 115 when the motor 115 is activated.

The motor 115 can include a controller 130 coupled to switching elements 135 (such as MOSFETs and/or other types of switching elements). The controller 130 is adapted to control the switching elements 135 to operate the motor 115 in response to a user input (such as actuation or depression of the trigger 112). As shown and as understood in the art, the controller 130 causes the switching elements 135 to selectively switch on and off various coils within the motor 115 so as to cause a magnetic interaction between the stator and rotor of the motor 115 and thereby drive the motor 115 and cause torque to be outputted via the axle 125. The switching elements 135 (such as MOSFETs) may be arranged in an H-bridge, for example, or in any other manner capable of operating the motor 115.

Figure 3:
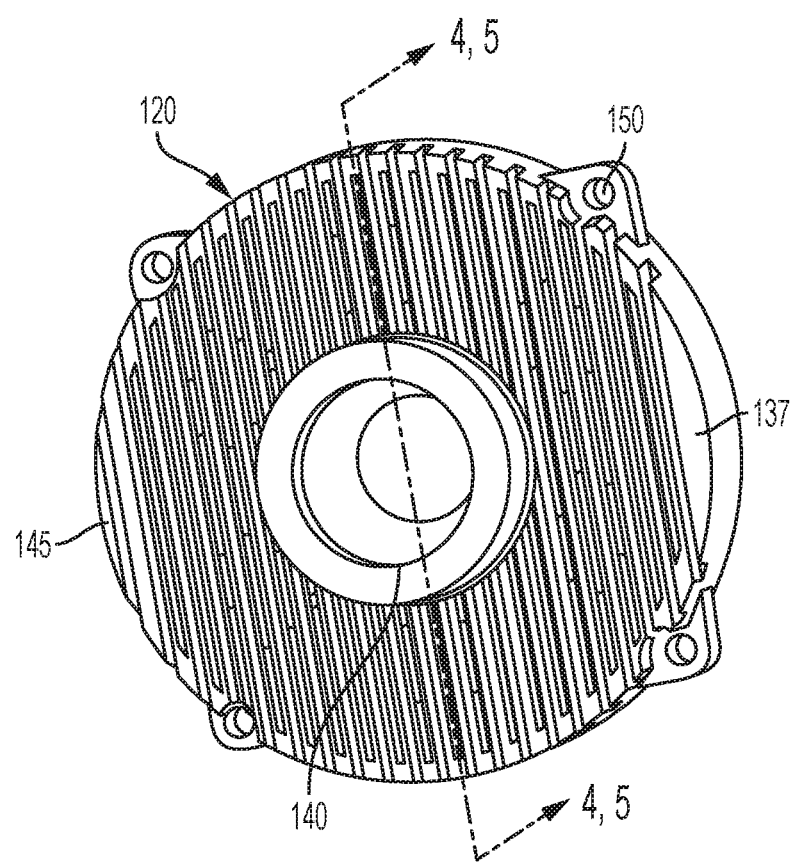
FIG. 3 is a front view of an end cap according to at least one embodiment of the present invention.
Figure 4:
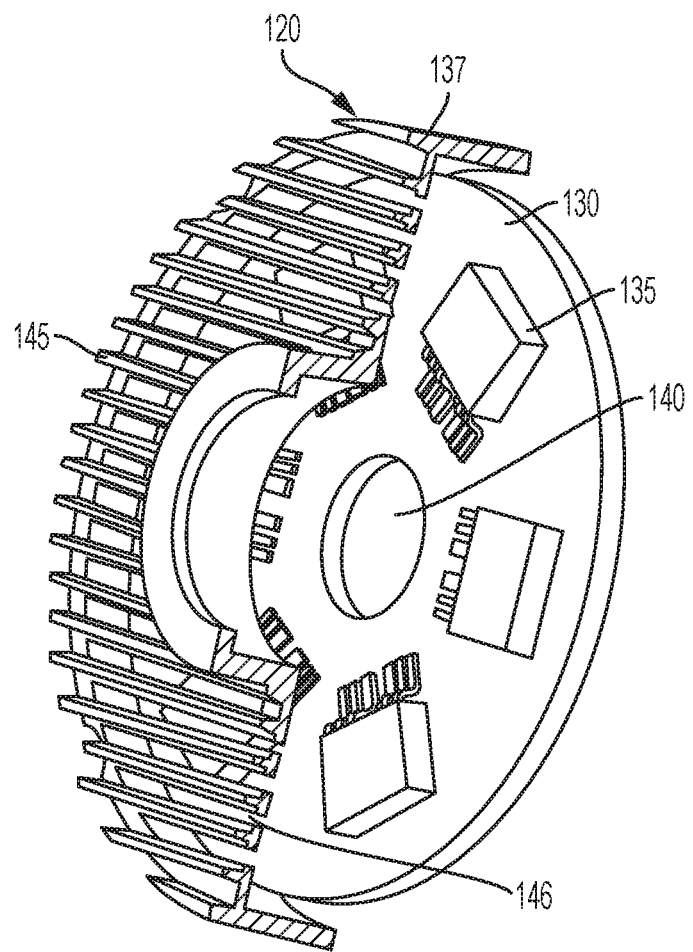
FIG. 4 is a partial side perspective sectional view of an end cap according to at least one embodiment of the present invention, as taken along line 4, 4 in FIG. 3.
Figure 5:
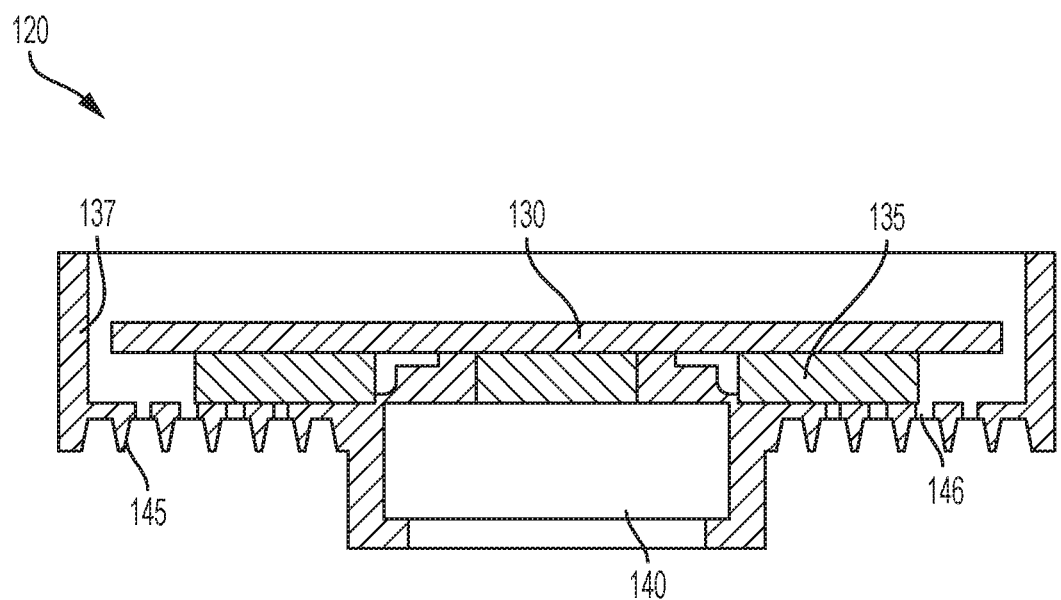
FIG. 5 is a side sectional view of an end cap according to at least one embodiment of the present invention, as taken along line 5, 5 in FIG. 3.

As shown in FIGS. 3-5, the end cap 120 can include an end cap base 137 and an end cap ring 140 within a central portion of the end cap 120, one or more fins 145 extending axially from the end cap 120, and one or more slots 146 between adjacent ones of the fins 145. The end cap ring 140 can be located in an axial center of the end cap 120 and define an end cap opening. The end cap ring 140 and end cap opening receive the bearing and shaft 125 of the motor 115, and allow the shaft 125 to extend through the end cap opening. The slots 146 allow air to flow into the motor 115 for proper ventilation and the fins 145 help dissipate heat from the motor 115. As shown in FIG. 3, the end cap 120 can further include connection portions 150 to allow a fastener to couple the end cap to the body 105 or the remainder of the tool 100. In some embodiments, the fastener couples the end cap 120 to the stator of the motor 115.

The fins 145 can be conventional fins used with heat sink structures to dissipate heat. The fins 145 can also be any other structure that increases the surface area of the end cap 120 and therefore allows the dissipation of heat from the controller 130 and switching elements 135. For example, the fins 145 can be curved or angled structures, or otherwise be shaped and sized to dissipate heat from the end cap 120. In an embodiment, the switching elements 135 can be directly coupled to the end cap 120 at the fins 145, as shown.

As shown in, for example, FIG. 5, the end cap 120 is coupled directly to the switching elements 135 which are coupled directly to the controller 130. In this manner, the end cap 120 can dissipate heat more directly and with better efficacy than structures that include other material between the end cap 120 and the switching elements 135. In other embodiments, the end cap 120 is thermally coupled to the switching elements and controller 130, meaning the end cap 120 is coupled to the switching elements and controller 130 via structure that is intended to conduct heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool comprising:
    a motor including a controller and switching elements, the controller controlling the switching elements to operate the motor in response to a user input;
    an end cap coupled to the motor, the end cap comprising:
        an end cap base;
        fins coupled to the end cap base; and
        a slot disposed between adjacent fins and extending through and across the end cap, wherein the slot is adapted to allow air to flow through the end cap, and
    wherein the switching elements are thermally coupled to the end cap.

2. The tool of claim 1, wherein the controller is directly coupled to the switching elements and wherein the switching elements are directly coupled to the end cap.

3. The tool of claim 2, wherein the switching elements are directly coupled to the end cap at the fins.

4. The tool of claim 1, wherein the fins extend axially from the end cap.

5. The tool of claim 1, wherein the motor includes an axle adapted to output torque generated by the motor.

6. The tool of claim 1, wherein the end cap includes connection portions for coupling the end cap to a portion of the tool.

7. The tool of claim 1, wherein the end cap includes an end cap ring located in an axial center of the end cap and defining an end cap opening.

8. A motor comprising:
    a controller that controls a rotation of the motor;
    switching elements electrically coupled to the controller, the controller adapted to control the switching elements to switch on and off in response to a user input;

an end cap coupled to the motor, the end cap comprising:
- an end cap base; and
- fins coupled to the end cap base; and
- a slot disposed between adjacent fins and extending through and across the end cap, wherein the slot is adapted to allow air to flow through the end cap, and wherein the switching elements are thermally coupled to the end cap.

9. The motor of claim 8, wherein the controller is directly coupled to the switching elements and wherein the switching elements are directly coupled to the end cap.

10. The motor of claim 9, wherein the switching elements are directly coupled to the end cap at the fins.

11. The motor of claim 8, wherein the fins extend axially from the end cap.

12. The motor of claim 8, wherein the motor includes an axle adapted to output torque generated by the motor.

13. The motor of claim 8, wherein the end cap includes connection portions for coupling the end cap to a portion of the tool.

14. The motor of claim 8, wherein the end cap includes an end cap ring located in an axial center of the end cap and defining an end cap opening.

* * * * *